United States Patent
Kanakarajan et al.

(10) Patent No.: US 9,838,870 B2
(45) Date of Patent: Dec. 5, 2017

(54) APPARATUS AND METHOD FOR AUTHENTICATING NETWORK DEVICES

(71) Applicant: Juniper Networks, Inc., Sunnyvale, CA (US)

(72) Inventors: Ravindranath C Kanakarajan, Bangalore (IN); Venkanna Thadishetty, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 240 days.

(21) Appl. No.: 14/668,834

(22) Filed: Mar. 25, 2015

(65) Prior Publication Data

US 2016/0286392 A1 Sep. 29, 2016

(51) Int. Cl.
*H04W 12/06* (2009.01)
*H04L 9/08* (2006.01)
(Continued)

(52) U.S. Cl.
CPC .......... *H04W 12/06* (2013.01); *H04B 7/1851* (2013.01); *H04L 9/0825* (2013.01); *H04L 9/32* (2013.01); *H04L 9/3247* (2013.01); *H04L 63/0884* (2013.01); *H04W 12/04* (2013.01); *H04W 76/022* (2013.01);
(Continued)

(58) Field of Classification Search
CPC ... H04W 12/06; H04W 12/04; H04W 76/022; H04B 7/1851; H04L 9/0825; H04L 9/32; H04L 9/3247; H04L 29/06863; H04L 63/0884
See application file for complete search history.

(56) References Cited

U.S. PATENT DOCUMENTS

2011/0154464 A1* 6/2011 Agarwal ............. H04L 63/0815
  726/8
2011/0167269 A1* 7/2011 Baykal .................. H04L 63/061
  713/169
(Continued)

OTHER PUBLICATIONS

T. Dierks et al.; The Transport Layer Security (TLS) Protocol Version 1.2; https://tools.ietf.org/html/rfc5246; Network Working Group; Aug. 2008.*
(Continued)

*Primary Examiner* — Samson Lemma
*Assistant Examiner* — Carlos Amorin
(74) *Attorney, Agent, or Firm* — FisherBroyles, LLP

(57) ABSTRACT

The disclosed apparatus may include (1) a reply-reception module, stored in memory, that receives, from a satellite device, an authentication reply that includes an original authentication message digitally signed by the aggregation device using a private key of the aggregation device and that is digitally signed by the satellite device using a private key of the satellite device, (2) a forwarding module, stored in memory, that forwards the authentication reply to a network management server, (3) a validation-reception module, stored in memory, that receives, from the network management server in response to forwarding the authentication reply, a validation message, and (4) an authentication module, stored in memory, that authenticates the satellite device based at least in part on receiving the validation message. Various other apparatuses, systems, and methods are also disclosed.

20 Claims, 5 Drawing Sheets

(51) Int. Cl.
 H04L 9/32 (2006.01)
 H04B 7/185 (2006.01)
 H04W 12/04 (2009.01)
 H04W 76/02 (2009.01)
 H04L 29/06 (2006.01)
(52) U.S. Cl.
 CPC ...... H04L 63/0281 (2013.01); H04L 63/0442 (2013.01); H04L 63/0876 (2013.01); H04L 63/126 (2013.01); H04L 2209/24 (2013.01); H04L 2209/72 (2013.01)

(56) References Cited

U.S. PATENT DOCUMENTS

| | | | | |
|---|---|---|---|---|
| 2013/0083691 A1* | 4/2013 | Murphy | ............... | H04W 12/06 370/254 |
| 2015/0058954 A1* | 2/2015 | Shah | ............... | H04L 63/162 726/7 |
| 2016/0099920 A1* | 4/2016 | Meuleman | ............... | H04L 63/0435 713/153 |
| 2016/0183087 A1* | 6/2016 | Lehtinen | ............... | H04L 63/0281 726/3 |
| 2016/0269899 A1* | 9/2016 | Carames | ............... | H04L 63/029 |

OTHER PUBLICATIONS

Secure Device Identity; IEEE Standard for Local and metropolitan area networks; Information technology—Telecommunications and Information exchange between systems—Local and metropolitan area networks—Par 1AR: Secure device identity; International Standard ISO/IEC/IEEE 8802-1AR; IEEE Computer Security; First Ed. Feb. 15, 2014.*
"Public key infastructure", https://en.wikipedia.org/wiki/Public_key_infrastructure, as accessed Feb. 12, 2015, Wikipedia, (Jan. 4, 2004).
"Public-key cryptography", https://en.wikipedia.org/wiki/Public-key_cryptography, as accessed Feb. 12, 2015, Wikipedia, (Jan. 4, 2004).
"Virtual Bridged Local Area Networks—Bridge Port Extension", http://standards.ieee.org/findstds/standard/802.1BR-2012.htm, as accessed Mar. 9, 2015, IEEE Standards Association, IEEE Std 802.1BR-2012, New York, NY, (Jul. 16, 2012).
"Secure Device Identity", http://standards.ieee.org/findstds/standard/802.1AR-2009.html, as accessed Mar. 9, 2015, IEEE Computer Society, IEEE Std 802.1AR-2009, New York, NY, (Dec. 22, 2009).
"TCG Infastructure WG—TPM Keys for Platform Identity for TPM 1.2", http://www.trustedcomputinggroup.org/files/static_page_files/0CF910BE-1A4B-B294D0C0B3924A9E4E97/TPM_Keys_for_Platform_Identity_v0_09_r9_PublicReview.pdf, as accessed Mar. 9, 2015, TCG, Specification Version 0.09, Revision 5, (Dec. 2, 2014).
"Trusted Platform Module", https://en.wikipedia.org/wiki/Trusted_Platform_Module, as accessed Feb. 12, 2015, Wikipedia, (Jul. 6, 2004).
"Transport Layer Security", https://en.wikipedia.org/wiki/Transport_Layer_Security, as accessed Feb. 12, 2015, Wikipedia, (Jan. 7, 2004).
"X.509", https://en.wikipedia.org/wiki/X.509, as accessed Feb. 12, 2015, Wikipedia, (Jul. 4, 2004).
"Digital Signature", https://en.wikipedia.org/wiki/Digital_signature, as accessed Feb. 12, 2015, Wikipedia, (Dec. 9, 2003).
"Certificate Authority", https://en.wikipedia.org/wiki/Certificate_authority, as accessed Feb. 12, 2015, Wikipedia, (Apr. 2, 2004).
"Flex Links", http://www.cisco.com/c/en/us/td/docs/switches/lan/catalyst6500/ios/12-2SX/configuration/guide/book/flexlink.html, as accessed Feb. 12, 2015, Cisco, Catalyst 6500 Release 12.2SX Software Configuration Guide, (Aug. 28, 2014).
T. Dierks et al.; The Transport Layer Security (TLS) Protocol Version 1.2; https://tools.ietf.org/html/rfc5246; RFC 5246; Network Working Group; Aug. 2008.
Secure Device Identity; IEEE Standard for Local and metropolitan area networks; Information technology—Telecommunications and information exchange between systems—Local and metropolitan area networks—Part 1AR: Secure device identity; International Standard ISO/IEC/IEEE 8802-1AR; IEEE Computer Society; First edition Feb. 15, 2014.

* cited by examiner

APPARATUS AND METHOD FOR AUTHENTICATING NETWORK DEVICES

INCORPORATION BY REFERENCE

This application incorporates, by reference, the following documents, which are concurrently filed with an Information Disclosure Statement in the U.S. Patent and Trademark Office:

The 802.1 BR IEEE Standard document ("802.1BR-2012—IEEE Standard for Local and metropolitan area networks—Virtual Bridged Local Area Networks—Bridge Port Extension") available at http://standards.ieee.ordfindstds/standard/802.1BR-2012.htm (accessed 9 Mar. 2015);

The 802.1 AR IEEE Standard document ("802.1AR-2009—IEEE Standard for Local and metropolitan area networks—Secure Device Identity") available at http://standards.ieee.org/findstds/standard/802.1AR-2009.html (accessed 9 Mar. 2015);

"TCG Infrastructure WG TPM Keys for Platform Identity for TPM 1.2" available at http://www.trustedcomputinggroup.orefiles/static_page_files/OCF910BE-1A4B-B294-D0C0B3924A9E4E97/TPM_Keys_for_Platform_identity_v0_09_r9_PublicReview.pdf (accessed 9 Mar. 2015).

BACKGROUND

The continued evolution of computer network protocols presents new challenges for today's enterprise organizations. In some examples, enterprise organizations may interconnect two separate computing networks to create a convenient single network. Devices that interconnect separate computing networks may be called "bridges." Similarly, enterprise organizations may also employ both physical computing resources and virtual computing resources, such as virtual machines, within the same bridged network.

One desirable feature in computer networking protocols is the ability to extend the ports of a network bridge to create an extended bridge. The extended ports may provide access for virtual machines in addition to physical computing systems. One standard for extending the ports of a bridge to achieve this function and other functions is 802.1 BR, which corresponds to the "Bridge Port Extension" protocol established by the IEEE 802 project of the IEEE Standards Association.

In accordance with the 802.1 BR protocol, a satellite device (e.g., a network edge device) may attempt to connect to a network managed by a network management server. In some scenarios, the satellite device may be able to connect to the network management server only through an aggregation device as an intermediary node. Unfortunately, the aggregation device and the satellite device may have no established method for ensuring a trusted connection between each other. Accordingly, the instant disclosure identifies and addresses a need for additional and improved apparatuses and methods for authenticating network devices.

SUMMARY

As will be described in greater detail below, the instant disclosure generally relates to apparatuses and methods for authenticating network devices. In one example, an apparatus, or aggregation device, for accomplishing such a task may include (1) a reply-reception module, stored in memory, that receives, from a satellite device, an authentication reply that: (A) includes an original authentication message digitally signed by the aggregation device using a private key of the aggregation device and (B) is digitally signed by the satellite device using a private key of the satellite device, (2) a forwarding module, stored in memory, that forwards the authentication reply to a network management server, (3) a validation-reception module, stored in memory, that receives, from the network management server in response to forwarding the authentication reply, a validation message that: (A) includes the original authentication message decrypted, by the network management server, using a public key of the aggregation device, (B) includes the authentication reply decrypted, by the network management server, using a public key of the satellite device, and (C) is digitally signed by the network management server using a private key of the network management server, (4) an authentication module, stored in memory, that authenticates the satellite device based at least in part on receiving the validation message, and (5) at least one physical processor configured to execute the reply-reception module, the forwarding module, the validation-reception module, and the authentication module.

Similarly, a corresponding method may include (1) receiving, from a satellite device, an authentication reply that: (A) includes an original authentication message digitally signed by an aggregation device within a network using a private key of the aggregation device and (B) is digitally signed by the satellite device using a private key of the satellite device, (2) forwarding the authentication reply to a network management server, (3) receiving, from the network management server in response to forwarding the authentication reply, a validation message that: (A) includes the original authentication message decrypted, by the network management server, using a public key of the aggregation device, (B) includes the authentication reply decrypted, by the network management server, using a public key of the satellite device, and (C) is digitally signed by the network management server using a private key of the network management server, and (4) authenticating the satellite device based at least in part on receiving the validation message.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, from a satellite device, an authentication reply that: (A) includes an original authentication message digitally signed by an aggregation device within a network using a private key of the aggregation device and (B) is digitally signed by the satellite device using a private key of the satellite device, (2) forward the authentication reply to a network management server, (3) receive, from the network management server in response to forwarding the authentication reply, a validation message that: (A) includes the original authentication message decrypted, by the network management server, using a public key of the aggregation device, (B) includes the authentication reply decrypted, by the network management server, using a public key of the satellite device, and (C) is digitally signed by the network management server using a private key of the network management server, and (4) authenticate the satellite device based at least in part on receiving the validation message.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
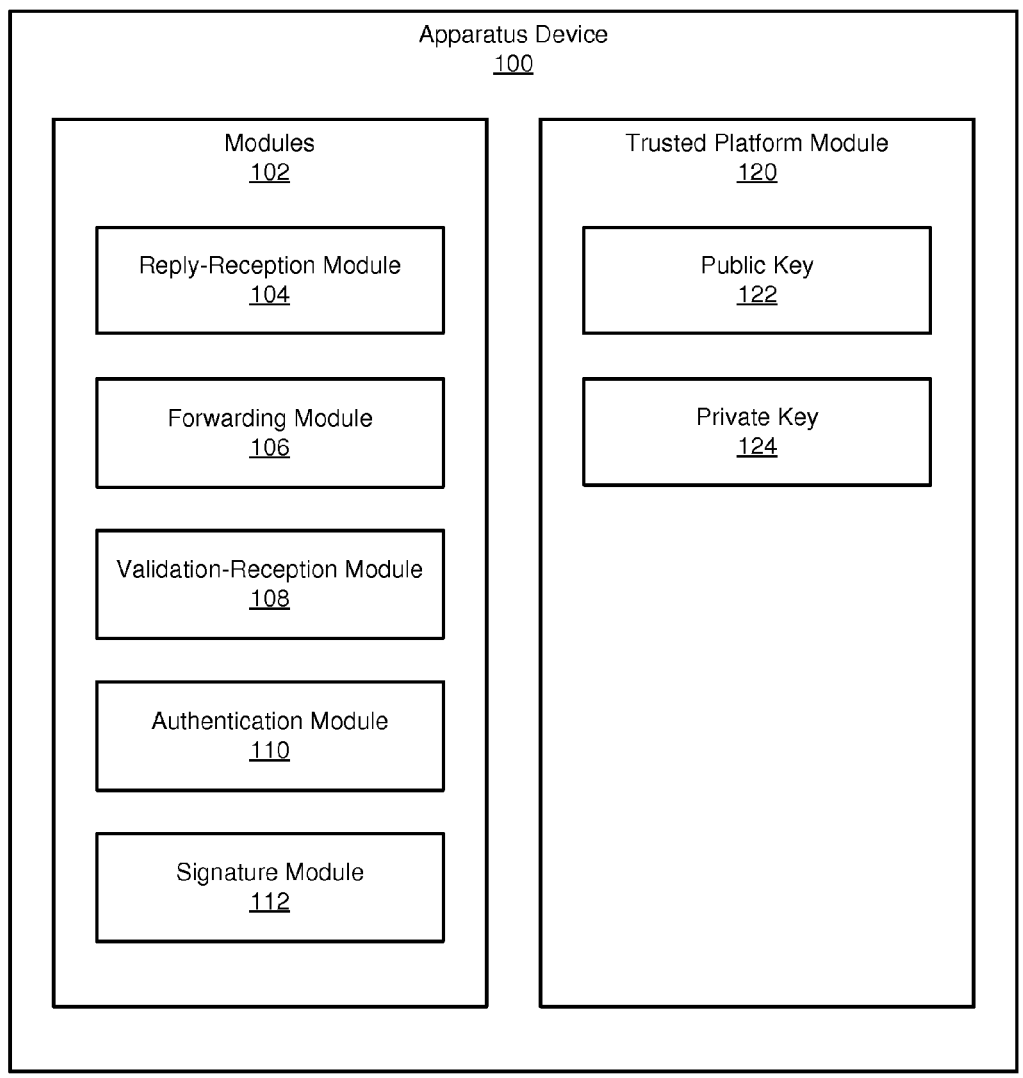
FIG. 1 is a block diagram of an exemplary aggregation device for authenticating network devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, methods, and computer readable media for authenticating network devices. As will be explained in greater detail below, embodiments of the instant disclosure may enable an aggregation device and a satellite device to establish a trusted network connection under a bridge extension protocol (such as a modified or unmodified version of the 802.1 BR protocol) even when neither the aggregation device nor the satellite device possesses a cryptographic key for authenticating the other. Accordingly, embodiments of the instant disclosure may enable a network or network administrator to maintain cryptographic keys within a centralized network management server rather than placing redundant copies of cryptographic keys within each aggregation device and/or satellite device on the network. Consequently, embodiments of the instant disclosure may minimize the burden on the network administrator by enabling the aggregation devices and satellite devices to be authenticated through the centralized network management server, as discussed further below.

The following will provide, with reference to FIGS. 1-2, examples of exemplary aggregation devices, satellite devices, and network management servers that may perform all or part of the disclosed methods for authenticating network devices, as discussed below. Similarly, detailed descriptions of corresponding computer-implemented methods will also be provided in connection with FIGS. 3-4. Finally, the discussion corresponding to FIG. 5 will provide numerous examples of systems that may include the components shown in FIGS. 1-4.

FIG. 1 is a block diagram of an exemplary aggregation device 100 for authenticating network devices. As illustrated in this figure, exemplary aggregation device 100 may include one or more modules 102 for performing one or more tasks. For example, and as will be explained in greater detail below, exemplary aggregation device 100 may include a reply-reception module 104 that receives, from a satellite device, an authentication reply that: (A) includes an original authentication message digitally signed by the aggregation device using a private key 124 of the aggregation device and (B) is digitally signed by the satellite device using a private key of the satellite device. Aggregation device 100 may also include a forwarding module 106 that forwards the authentication reply to a network management server.

Additionally, aggregation device 100 may also include a validation-reception module 108 that receives, from the network management server in response to forwarding the authentication reply, a validation message that: (A) includes the original authentication message decrypted, by the network management server, using a public key of the aggregation device, (B) includes the authentication reply decrypted, by the network management server, using a public key of the satellite device, and (C) is digitally signed by the network management server using a private key of the network management server. Moreover, aggregation device 100 may also include an authentication module 110 that authenticates the satellite device based at least in part on receiving the validation message. Furthermore, aggregation device 100 may include a signature module 112 that may digitally sign the original authentication message, as discussed further below.

Furthermore, aggregation device 100 may also include a trusted platform module 120, which may store private key 124 of aggregation device 100 as well as a copy of a public key 122 of the network management server. Trusted platform module 120 may include a secure cryptoprocessor that secures the aggregation device by integrating at least one cryptographic key into the aggregation device. In some examples, trusted platform module 120 may satisfy the specifications established by a computer industry consortium called the TRUSTED COMPUTING GROUP.

Figure 2:
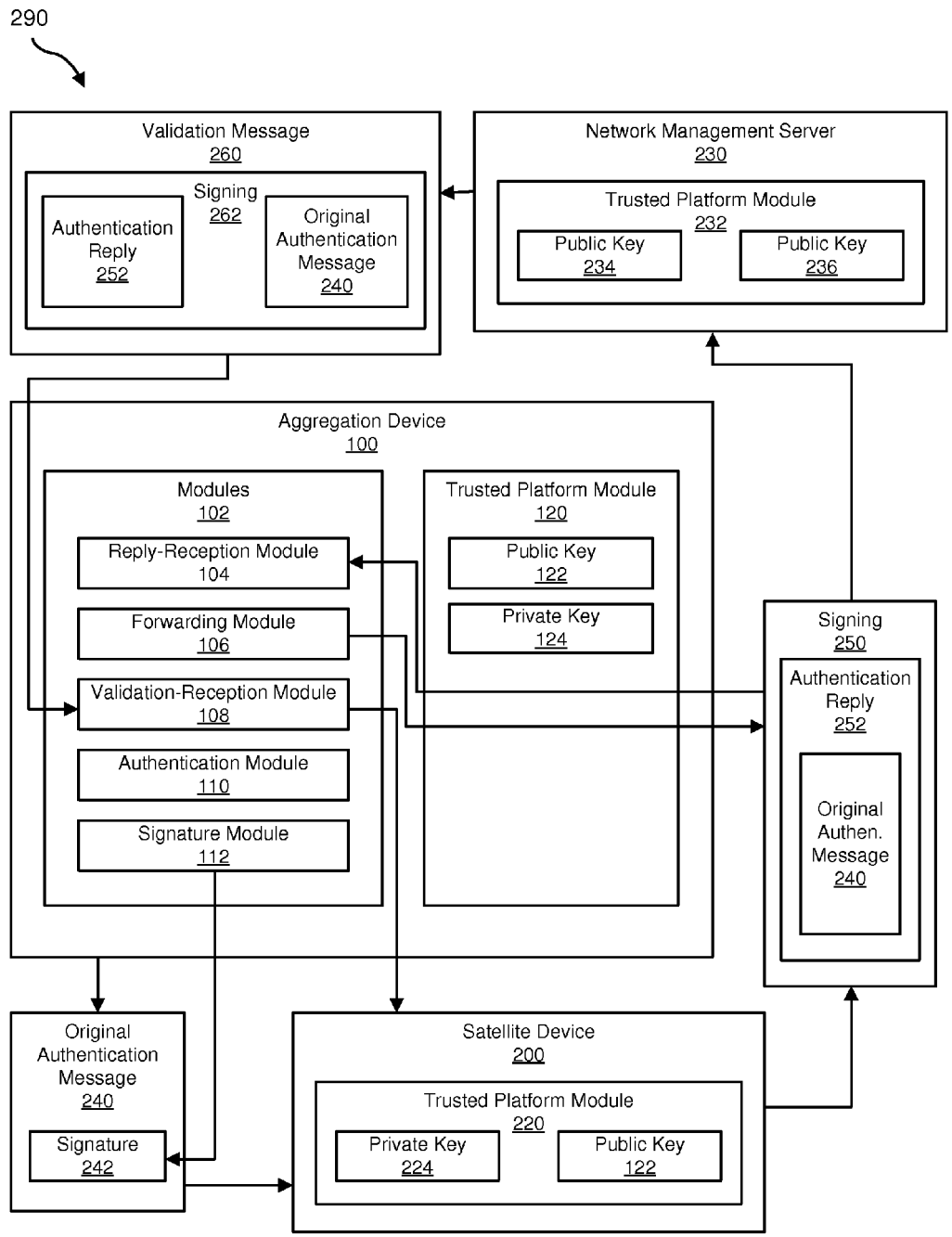
FIG. 2 is a block diagram of an exemplary system for authenticating network devices.

As shown in FIG. 2, aggregation device 100 may constitute part of a larger system 290. As shown in that figure, system 290 may also include, in addition to aggregation device 100, a satellite device 200 and a network management server 230. In one embodiment, aggregation device 100 may aggregate one or more other logical or physical devices, such as network switches, such that aggregation device 100 manages the network switches as logical line cards of aggregation device 100. In further examples, one or more satellite devices or network edge devices, such as satellite device 200, may seek to connect to a network managed by network management server 230. In these examples, satellite device 200 may attempt to connect to the network through aggregation device 100 as an intermediary node within the network.

In the above example, aggregation device 100 and satellite device 200 may not have any established ability to authenticate each other to create a trusted network connection. For example, as shown in FIG. 2, aggregation device 100 may only possess private key 124 of aggregation device 100 and public key 122 of network management server 230. Similarly, satellite device 200 may also only contain, within a corresponding Trusted Platform Module 220, its own private key 224 and another copy of public key 122 of network management server 230.

For ease of discussion and illustration, FIG. 2 also displays each of modules 102 that were initially shown in FIG. 1 without showing corresponding modules within satellite device 200 and network management server 230. Nevertheless, both satellite device 200 and/or network management server 230 may include one or more modules that parallel each of modules 102 within aggregation device 100. For example, satellite device 200 may include a transmission module that corresponds to reply-reception module 104 and that transmits the authentication reply received by reply-reception module 104. The other computing network devices shown in FIG. 2 may also contain any other number of corresponding modules for performing any of the steps of the methods discussed below regarding FIGS. 3-4. Similarly, as also shown in FIG. 2, network management server 230 may include a Trusted Platform Module 232 that Parallels Trusted Platform Module 120 and Trusted Platform Module 220. In the example of FIG. 2, trusted platform module 232 within network management server 230 may include both a public key 234 of aggregation device 100 and a public key 236 of satellite device 200.

As used herein, the terms "public key" and "private key" generally refer to asymmetric cryptography key pairs. In general, each key in each pair may encrypt, or decrypt, a message for (or from) the other without knowledge of the other key. For example, a public key may decrypt a message encrypted by a corresponding private key without knowledge of the private key. The term "public key" may refer to one key from each pair that has a lower degree of secrecy than the other key. Similarly, the term "private key" may refer to the other key from each pair that has a corresponding higher degree of secrecy. In exemplary embodiments, the public key may be freely publicized and exchanged whereas the private key may be held absolutely secret by the owner.

By analogy, a public key may function as a metaphorical storage locker that enables anyone to drop a message in the locker but only permits the owner of the private key to read the contents of the messages within the locker. Similarly, a private key may function as a metaphorical signature that enables anyone to read a signed message and authenticate the message as signed by the owner of the private key. In other words, the public key may provide confidentiality whereas the private key may provide authenticity.

In general, some systems may use asymmetric key pairs within a Public Key Infrastructure that utilizes a Certificate Authority to bind public keys to corresponding private key owners. For example, the recipient of a message signed using a private key, which identifies a particular public key for decryption, may wish to verify that the public key actually corresponds to the ostensible author of the message. Otherwise, an imposter could use the imposter's own asymmetric key pair to sign the imposter's message and then provide the corresponding public key to the recipient to decrypt the message. Accordingly, a public and reputable Certificate Authority may register public keys with corresponding owners and then issue public key certificates, signed by the Certificate Authority, to certify that the ostensible owner of the public key (as shown in the public key certificate) is the actual owner of the public key. The recipient of the message may then feel confident using the public key to send reply messages to the original sender of the original message using the provided public key.

In contrast, Certificate Authorities and corresponding Public Key Infrastructures may be unnecessary if the possessor of a public key has an alternative method for ensuring that the ostensible identity corresponding to the public key is accurate. In the example of FIG. 2, each Trusted Platform Module may provide an alternative method for ensuring that the ostensible identity corresponding to each public key is accurate, as discussed below. Accordingly, system 290 may not involve either a Certificate Authority or a Public Key Infrastructure for all or part of method 300. Similarly, in some alternative embodiments, system 290 may use symmetric key pairs instead of asymmetric key pairs.

Returning to FIG. 2, the disclosed apparatuses and methods may authenticate network devices in the following manner, for example. Reply-reception module 104 may receive, from satellite device 200, an authentication reply 252 that includes an original authentication message 240 digitally signed (e.g., digitally signed by signature module 112, as shown by a signature 242) by aggregation device 100 using private key 124 of aggregation device 100. Authentication reply 252 may also be digitally signed by satellite device 200 using private key 224 of satellite device 200, as shown by signing 250 in FIG. 2. Forwarding module 106 may forward authentication reply 252 to network management server 230. Validation-reception module 208 may receive, from network management server 230 in response to forwarding authentication reply 252, a validation message 260 that (A) includes original authentication message 240 decrypted, by network management server 230, using a public key 234 of aggregation device 100, (B) includes authentication reply 252 decrypted, by network management server 230, using a public key 236 of satellite device 200, and (C) is digitally signed by network management server 230 using a private key of network management server 230 (not shown in FIG. 3). Moreover, authentication module 110 may authenticate satellite device 200 based at least in part on receiving validation message 260. Authentication module 110 and satellite device 200 may similarly establish a trusted network connection between aggregation device 100 and satellite device 200 (i.e., may authenticate and validate each other) based at least in part on receiving validation message 260, as discussed further below.

Figure 3:
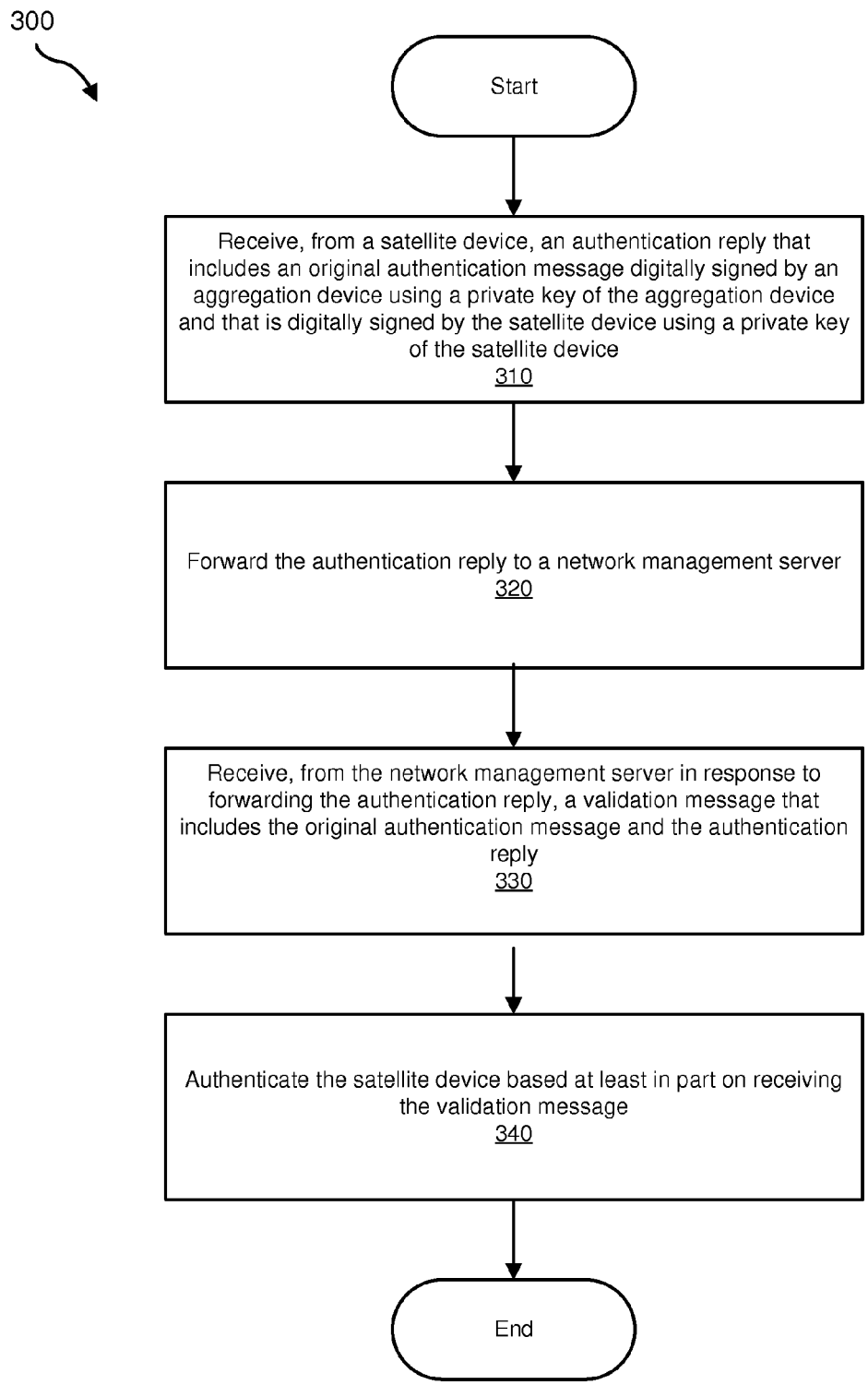
FIG. 3 is a flow diagram of an exemplary method for authenticating network devices.

FIG. 3 is a flow diagram of an exemplary computer-implemented method 300 for authenticating network devices. The steps shown in FIG. 3 may be performed by any suitable computer-executable code and/or computing system. In some embodiments, the steps shown in FIG. 3 may be performed by one or more of the components of aggregation device 100 in FIG. 1, system 290 in FIG. 2, and/or portions of exemplary computing system 500 in FIG. 5.

As illustrated in FIG. 3, at step 310, one or more of the systems described herein may receive, from a satellite device, an authentication reply that includes an original authentication message digitally signed by an aggregation device using a private key of the aggregation device and that is digitally signed by the satellite device using a private key of the satellite device. For example, reply-reception module 104 may, as part of aggregation device 100, receive, from satellite device 200, authentication reply 252 that includes original authentication message 240 digitally signed by aggregation device 100 using private key 124 of aggregation device 100.

As used herein, the term "satellite device" generally refers to any network device attempting to establish a network connection with a network managed by a network management server through an aggregation device as an intermediary node, as discussed above and further discussed below. In some examples, the satellite device may constitute a network edge device that only has connection to the network through the aggregation device as the intermediary node. In further examples, a satellite device may include a switch or router that connects to an aggregation device, under a bridge extender protocol, such as 802.1 BR (discussed above), such that the aggregation device sees the satellite device as a line card. Moreover, as used herein, the phrase "device that performs an action" generally refers to the device being physically configured or programmed to perform the action.

Moreover, as used herein, the term "original authentication message" generally refers to a network message transmitted prior to an authentication reply, as discussed above and as discussed further below. In general, the original authentication message and/or the authentication reply may constitute parts of a network handshake procedure through which the satellite device attempts to connect to the network. In some examples, aggregation device 100 may transmit the original authentication message in response to a request, from satellite device 200, to gain access to the network managed by the network management server. Similarly, as used herein, the term "authentication reply" generally refers to a reply message transmitted in response to the original authentication message. In some examples, the original authentication message and/or the authentication reply may be digitally signed. Moreover, the original authentication message and/or the authentication reply may be transmitted according to a bridge extender protocol, such as 802.1 BR.

Figure 4:
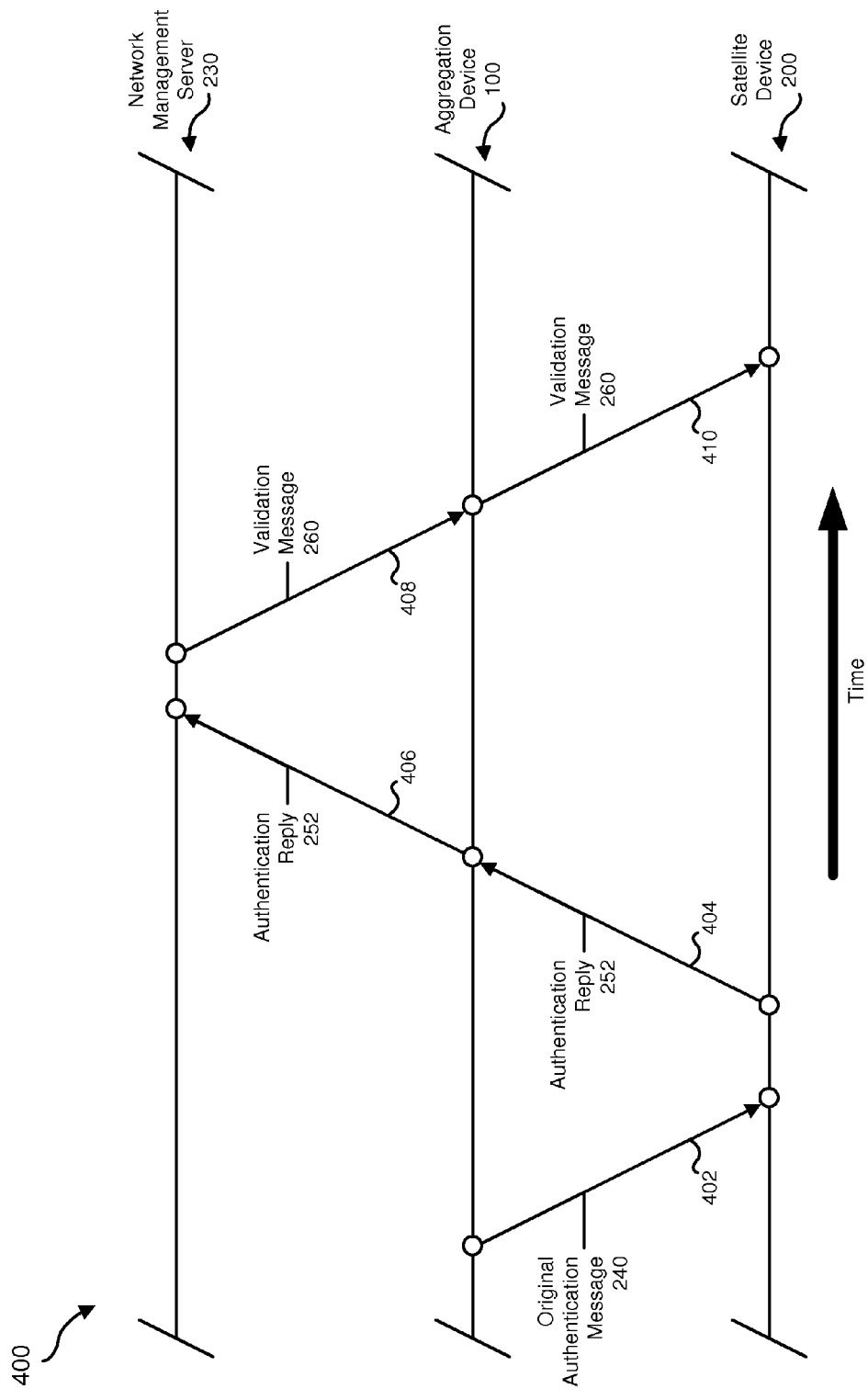
FIG. 4 is an exemplary timing diagram that illustrates a timing for authenticating network devices.

Reply-reception module 104 may receive authentication reply 252 in a variety of ways. To further explain the disclosed method, FIG. 4 shows an exemplary timing diagram 400 that illustrates a timing according to method 300 in FIG. 3. As shown in FIG. 4, at step 402, aggregation device 100 may transmit original authentication message 240 to satellite device 200. Aggregation device 100 may transmit original authentication message 240 to satellite device 200 in response to receiving a network access request from satellite device 200, as discussed above. Next, at step 404, which may correspond to step 310 of method 300, reply-reception module 104 within aggregation device 100 may receive authentication reply 252, as discussed further below.

In general, to digitally sign a message, a computing device, such as aggregation device 100 and/or satellite device 200 may first acquire a private key. In some examples, original authentication message 240 may include, or correspond to, a secure device identifier for aggregation device 100. Similarly, authentication reply 252 may include, or correspond to, a secure device identifier for satellite device 200. As used herein, the term "secure device identifier" generally refers to a cryptographic identity that is bound to a device and used for assertion of the device's identity. In some examples, the secure device identifier is based on a unique or secret value that is tightly integrated within the device in a manner that renders it infeasible for someone to forge or transfer the secure device identifier. In further examples, a secure cryptoprocessor may generate and/or protect the secure device identifier. The secure cryptoprocessor make conform to the specifications of the Trusted Platform Module established by the Trusted Computing Group, as discussed above.

In further examples, the secure device identifier may include, or correspond to, a DEVID in accordance with the 802.1 AR ("Secure Device Identity") protocol established by the 802 project of the IEEE Standards Association. A device may implement DEVID secure identifiers using a Trusted Platform Module, as outlined in ANNEX B of the 22 Dec. 2009 IEEE Standard document for the 802.1 AR protocol. In general, a DEVID may constitute, or correspond to, an asymmetric pair of cryptographic keys, including specifically a public key and a private key, as discussed above. Accordingly, network devices that seek to send encrypted communications to another network device with a DEVID may use the public key portion of the DEVID to encrypt those communications, thereby ensuring that only the device may decrypt the communications using the device's private key. Similarly, network devices can trust that digitally signed network communications originate from the network device that signed those communications using the device's private key. Network devices may use one or both of these techniques to authenticate network devices using the respective DEVIDs. For example, a network may authenticate a network device based on the device's DEVID according to one of the handshake scenarios outlined in ANNEX C of the 22 Dec. 2009 IEEE Standard document for the 802.1 AR protocol. In general, network devices must keep their private keys secret to ensure successful encryption. For example, network devices may keep their private keys secret within a Trusted Platform Module, as discussed above.

The 802.1 AR protocol may function in a manner that is parallel to conventional Public Key Infrastructure systems, except that 802.1 AR enables the authentication of network devices instead of other objects such as websites, as in the SECURE SOCKETS LAYER ("SSL") and TRANSPORT LAYER SECURITY ("TLS") cryptographic protocols. Accordingly, the 802.1 AR protocol specifies that DEVIDs (e.g., DEVID credentials or public key certificates) take the form of versions of X.509 credentials or public key certificates, analogous to the certificates used within the SSL and TLS protocols. Similarly, in systems using the 802.1 AR protocol, a Certificate Authority may digitally sign public key certificates to enable network devices to trust that a specified public key corresponds (e.g., is registered to) an alleged owner of the public key and associated DEVID.

DEVIDs may take one of at least two different forms. An initial DEVID, or IDEVID, may specify the unique serial number, or other value, that ties the network device to its manufacturer. In other words, the secure device identifier may correspond to a secure device identifier that (1) a manufacturer of the aggregation device assigned to the aggregation device and (2) the manufacturer of the aggregation device signed with a private key of the manufacturer to validate the aggregation device. The manufacturer may establish the IDEVID during manufacturing or an administrator may establish the IDEVID during provisioning of the network device within a network (e.g., in communication with the manufacturer's Certificate Authority). For example, the manufacturer may establish a remote Certificate Authority, which may provide a public key certificate, from the manufacturer, that establishes the identity of the network device. For example, upon provisioning the network device, the administrator may verify the identity of the network device, based on the IDEVID, such as by requesting the public key certificate from the Certificate Authority and/or by decrypting a signature of the corresponding public key certificate using the public key of the manufacturer.

As a second example, the DEVID may take the form of a local secure device identifier or LDEVID. The LDEVID may optionally use the same private key as the IDEVID, which will continue to tie the network device to the identity established by the manufacture (i.e., enable a person to trace the network device to its origin at the manufacturer). Alternatively, the LDEVID may use a different private key than the IDEVID (i.e., preventing a person from tracing the network device to its origin at the manufacturer). Notably, an activated DEVID module contains one IDEVID but may contain zero, or any number, of LDEVIDS, because these are optional. The apparatuses and methods disclosed herein may use either IDEVIDs or LDEVIDs. Notably, the X.509 certificate for a DEVID may not specify whether the DEVID constitutes an IDEVID or LDEVID.

As discussed above, the apparatuses and methods disclosed herein may not fully utilize a Certificate Authority or Public Key Infrastructure. For example, after optionally verifying the identity of a network device using the manufacturer's IDEVID, as discussed above, a network administrator may provision DEVID public keys and private keys, as shown in FIG. 2, thereby securing these keys within a secure location, such as a Trusted Platform Module. In one example, the network administrator may obtain the DEVID public key certificate from the DEVID module and/or generate new LDEVID asymmetric key pairs, as discussed above. In generating asymmetric key pairs, the DEVID module may interface with a Trusted Platform Module. After obtaining at least one public key for each network device, the network administrator and/or the corresponding network administration module (e.g., an administration module 114, not shown in FIG. 2) may secure the public keys within future counterparties of those network devices, thereby enabling the counterparties to decrypt digitally signed messages from the network devices and to verify their authorship. Moreover, in the absence of a Certificate Authority, the DEVID credentials (e.g., the versions of X.509 certificates) used herein may omit the public key from the DEVID credential and, instead, keep the public key "quasi-private" or secret (e.g., within a Trusted Platform Module of the recipient), as shown in FIG. 2, and as discussed further below. Similarly, the DEVID credentials may be signed by the sender of the DEVID credential (e.g., the owner of the DEVID credential) rather than being signed by a Certificate Authority.

As shown in FIG. 2, the network administrator may secure a copy of public key 122 of network management server 230 within each of Trusted Platform Module 120 (within aggregation device 100) and trusted platform module 220 (within satellite device 200). Similarly, the network administrator may secure public key 234 of aggregation device 100 and public key 236 of satellite device 200 within Trusted Platform Module 232 (within network management server 230). Of course, each device may maintain its own private key within its own Trusted Platform Module, as discussed above, and these private keys should never be shared or else the cryptographic security will be potentially compromised.

The example of DEVIDs is merely exemplary. One key virtue of an IDEVID is that the IDEVID ties the network device to its origin at the manufacturer, as verified by the manufacturer's Certificate Authority. Nevertheless, the disclosed apparatuses and methods may not use Certificate Authorities, as discussed above. Accordingly, the secure device identifier may constitute any specified, random, unique (e.g., a GLOBALLY UNIQUE IDENTIFIER), and/or serial number or other value for the network device. The manufacturer and/or the network administrator may specify the secure device identifier. When provisioning the various public keys, as discussed above, the network administrator may similarly map, or designate, the corresponding network device name, identifier, and/or serial number that corresponds to each public key. When receiving a public key certificate that specifies the network device name, identifier, and/or serial number, the receiving device may then attempt to decrypt a signature portion of the public key certificate (or other message) using the public key mapped, or designated, by the network administrator during the provisioning process (which may be the same as the public key specified in the public key certificate), as discussed above.

In some examples, the secure device identifier may simply correspond to the index value that the network administrator used to index public keys within a multitude of public keys (or to otherwise identify the owner of a public key), such as the public keys within network management server 230 (e.g., public key "1" for aggregation device 100 and public key "2" for satellite device 200). In other examples, the secure device identifier may include, or correspond to, the value of the "subject" field of the DEVID X.509 credential. The value of the "subject" field may be formatted as a unique X.500 Distinguished Name ("DN"), which may include the unique device serial number (e.g., with the "serialNumber" attribute) assigned by the manufacturer or any other suitable unique DN value that the issuer prefers.

In other examples, the original authentication message and the authentication reply may not include, or correspond to, secure device identifiers. Rather, these messages may contain any arbitrary or random message for authenticating network devices according to the methods and techniques discussed herein. Notably, any device in FIG. 2 can authenticate another network device, without obtaining the other network device's secure device identifier, simply by successfully decrypting a message from the other network device using the public key of the other network device, thereby verifying that the other network device signed the message using its private key. Moreover, both DEVID modules and Trusted Platform Modules contain random number generators, by specification, which enables manufacturers and/or network administrators to assign unique secure device identifiers to network devices.

Notably, for any one or more of the messages shown in FIGS. 2 and 4, the message may take one of two different forms. First, the message may include original content and a signature of the original content (or a signature of a hash of the original content), which may be appended to the original content. In this case, a receiver of the message may authenticate the transmitter of the message by decrypting the signature. This form of message also has the benefit of enabling the receiver to confirm that the original content and the appended signature match each other for consistency. Nevertheless, this form of message has the potential disadvantage of revealing the original content to any network device that obtains the message. In other words, any network device that receives the message will learn of the non-encrypted original content even without decrypting the signature. In the example of FIG. 2, aggregation device 100 has used this form of message by including signature 242 within original authentication message 240.

Moreover, this form of message, which includes the non-encrypted version of content together with a digital signature, may have the benefit of enabling aggregation device 100 and/or satellite device 200 to verify that the decrypted version of authentication reply 252 and/or original authentication message 240 corresponds to the digitally signed version originally sent to network management server 230. In other words, without including a non-encrypted version of the content with authentication reply 252 and/or original authentication message 240, then a network device that lacks a public key for the corresponding message may be unable to verify that the decrypted version signed by network management server 230 actually corresponds to the originally transmitted and encrypted version.

Alternatively, the entire message may be digitally signed without the non-encrypted version of the content being exposed. This form of the message enables a transmitter of the message to verify that a receiver of the message possesses a public key of the transmitter. Notably, although conventional public keys may be freely revealed, the public keys of FIG. 2 may be "quasi-private" in the sense that they may be securely stored within a respective Trusted Platform Module or otherwise securely held. The "quasi-private" nature of these public keys may enable a transmitter of the message to authenticate a receiver by verifying that the receiver possesses the respective public key (otherwise the receiver would be unable to decrypt and send back the encrypted message in decrypted form). For example, aggregation device 100 may encrypt original authentication message 240, without transmitting a non-encrypted version, and similarly satellite device 200 may encrypt authentication reply 252, without transmitting a non-encrypted version. In the example of FIG. 2, satellite device 200 has used this form of message by signing 250 the entirety of authentication reply 252. Accordingly, aggregation device 100 and satellite device 200 may verify that network management server 230 possesses the respective public keys (i.e., public key 234 and public key 236) by obtaining decrypted versions of those messages with validation message 260. Notably, in this case, aggregation device 100 and/or satellite device 200 may not want to use a message that another network device could easily predict (such as a simple network device name, identifier, and/or serial number) without possessing the corresponding public key. Rather, aggregation device 100 and/or satellite device 200 may prefer to send an arbitrary, random, and/or otherwise unpredictable value (e.g., a number generated by the random number generator component of the DEVID module and/or Trusted Platform Module) to ensure the integrity of the cryptographic communications.

Without encrypting the entire message, aggregation device 100 and/or satellite device 200 must rely on the private signature of network management server 230 (e.g., signing 262 in FIG. 2) without verifying that network management server 230 actually decrypted their messages using the respective public keys. In other words, by encrypting the entirety of the message, without appending a decrypted version of the message, aggregation device 100 and/or satellite device 200 prevents network management server 230 from simply signing the non-encrypted content of the messages without even attempting to decrypt the encrypted content of the messages (e.g., in the case that an imposter device pretends to be network management server 230 without possessing the public keys, or in the case that network management server 230 is compromised and/or has lost public key 234 and/or public key 236).

Returning to FIG. 3, at step 310, reply-reception module 104 may receive authentication reply 252 in response to transmitting digitally signed original authentication message 240. Moreover, aggregation device 100 may have initially transmitted original authentication message 240 in response to receiving a network access request from satellite device 200 in an attempt to connect to the network, as discussed above.

Notably, authentication reply 252 includes original authentication message 240 embedded, and signed, within itself. By signing original authentication message 240, satellite device 200 may ensure that aggregation device 100 cannot tamper with, or disturb, the content of original authentication message 240 after receiving authentication reply 252 and before forwarding authentication reply 252 to network management server 230 (i.e., because aggregation device 100 does not possess a public, or quasi-private, key of satellite device 200 and, therefore, cannot decrypt authentication reply 252).

Returning to FIG. 3, at step 320 one or more of the systems described herein may forward the authentication reply to the network management server. For example, forwarding module 106 may, as part of aggregation device 100, forward authentication reply 252 to network management server 230.

As used herein, the term "network management server" generally refers to any server that manages, at least in part, a computer network. Specifically, network management servers may include centralized servers that manage access to the network. In general, network management server 230 may maintain public keys for aggregation devices, satellite devices, and/or other devices that seek access to the network and use those public keys (or "quasi-private" keys, as discussed above) to authenticate network devices and grant them network access.

Forwarding module 106 may forward authentication reply 252 to network management server 230 in a variety of ways. In some embodiments, forwarding module 106 may forward authentication reply 252 without adding introductory content. In these embodiments, network management server 230 may be configured to interpret messages formatted in the format of authentication reply 252 as corresponding authentication replies, thereby triggering network management server 230 to attempt to decrypt those messages using corresponding public keys. Alternatively, forwarding module 106 may append one or more introductory messages, or fields of data, that explain the nature of authentication reply 252 and/or request that network management server 230 attempt to decrypt and authenticate authentication reply 252, including embedded original authentication message 240. Returning to the example of FIG. 4, at step 406, which may correspond to step 320 of method 300, forwarding module 106 within aggregation device 100 may forward authentication reply 252 to network management server 230.

Returning to FIG. 3, at step 330 one or more of the systems described herein may receive, from the network management server in response to forwarding the authentication reply, a validation message. The validation message may (A) include the original authentication message decrypted, by the network management server, using a public key of the aggregation device, (B) include the authentication reply decrypted, by the network management server, using a public key of the satellite device, and (C) be digitally signed by the network management server using a private key of the network management server. For example, at step 330, validation-reception module 108 may, as part of aggregation device 100, receive validation message 260 shown in FIG. 2. As used herein, the term "validation message" generally refers to a message, received from a network management server, that includes both an original authentication message and an authentication reply, in decrypted form, to thereby authenticate or validate a corresponding aggregation device and satellite device, as further discussed below.

Validation-reception module 108 may receive validation message 260 in a variety of ways. In general, validation-reception module 108 may receive a result, whether positive or negative, of the attempt by network management server 230 to authenticate aggregation device 100 and/or satellite device 200 based on a further attempt to decrypt authentication reply 252. Network management server 230 may decrypt authentication reply 252 using public key 234 of aggregation device 100 and public key 236 of satellite device 200. Specifically, network management server 230 may first use public key 236 of satellite device 200 to decrypt authentication reply 252, in which original authentication message 240 is embedded. Next, network management server 230 may use public key 234 of aggregation device 100 to decrypt original authentication message 240 embedded within authentication reply 252 that was signed by satellite device 200.

In some examples, network management server 230 may select public key 234 and/or public key 236 based on an alleged, or ostensible, identity of the author of original authentication message 240 and/or authentication reply 252 indicated within non-encrypted content appended to authentication reply 252. For example, network management server 230 may index public keys with corresponding identities of network devices (e.g., within trusted platform module 232). In other words, in some examples, aggregation device 100 and/or satellite device 200 may append an indication of their identity to original authentication message 240 and/or authentication reply 252, thereby specifying which public key network management server 230 should use to attempt to decrypt the corresponding messages.

In embodiments where aggregation device 100 and/or satellite device 200 transmitted a non-encrypted version of the content of original authentication message 240 and/or authentication reply 252, respectively, network management server 230 may compare the results of decryption with the non-encrypted version of the content. Alternatively, in some examples, decrypted version of original authentication message 240 and/or authentication reply 252 may specify a network device name or identifier, as discussed above, which network management server 230 may check to see if it matches the public key used to decrypt the corresponding message.

Network management server 230 may transmit validation message 260 alone to aggregation device 100. In this case, aggregation device 100 may be configured to interpret the reception of validation message 260 alone as an authentication of both aggregation device 100 and satellite device 200. In other words, validation message 260 indicates that network management server 230 possesses corresponding public keys for decrypting messages from aggregation device 100 and/or satellite device 200, because validation message 260 includes decrypted versions of messages from these devices (e.g., in the case that original authentication message 240 and authentication reply 252 were not transmitted with non-encrypted copies of their content, as discussed above). Additionally, or alternatively, validation message 260 indicates that network management server 230 trusts aggregation device 100 and/or satellite device 200, because validation message 260 is digitally signed by network management server 230 using its private key. Similarly, aggregation device 100 and/or satellite device 200 may trust that validation message 260 was genuinely authored by network management server 230 because validation message 260 was digitally signed by network management server 230, which the other devices can prove because they decrypt validation message 260 using their copies of its public key. In the example of FIG. 4, validation-reception module 108 may receive validation message 260 from network management server 230 at step 408, which may correspond to step 330 in method 300.

Returning to FIG. 3, at step 340, one or more of the systems described herein may authenticate the satellite device based at least in part on receiving the validation message. For example, authentication module 110 may, as part of aggregation device 100, authenticate satellite device 200 based at least in part on receiving validation message 260. As used herein, the phrase "authenticating" a device generally refers to establishing a trusted network connection with the corresponding device within the context of a computing network protocol, such as a modified or unmodified 802.1 BR and/or 802.1 AR authentication handshake, as discussed above.

Authentication module 110 may authenticate satellite device 200 in a variety of ways. In some examples, authentication module 110 may switch from a mode that attempts to authenticate satellite device 200 to a mode that allows satellite device 200 to access the computing network using aggregation device 100 as an intermediary node (e.g., instead of discarding, blocking, and/or inhibiting ordinary network packets from satellite device 200). In further examples, authentication module 110 may authenticate satellite device 200 by completing a secured connection handshake and/or transmitting a symmetric cryptographic key for further network communications.

Notably, any one or more of modules 106-110 may forward validation message 260 to satellite device 200. In the example of FIG. 4, at step 410, one or more of modules 106-110 may forward validation message 260 to satellite device 200. Satellite device 200 may then authenticate aggregation device 100 based on receiving validation message 260 in a manner that parallels how aggregation device 100 authenticated satellite device 200 at step 340 of method 300. Specifically, satellite device 200 may authenticate aggregation device 100 based on the proven ability of network management server 230 to decrypt original authentication message 240 and/or based on network management server 230 digitally signing validation message 260, thereby certifying that both aggregation device 100 and satellite device 200 are trusted by network management server 230. In other words, network management server 230 may be configured such that the server will only digitally sign a validation message to certify that the authors of both the original authentication message and the authentication reply are trusted.

In the above examples, the disclosed apparatuses and methods may enable a network management server and/or network administrator (or corresponding network administration module) to more efficiently administer asymmetric cryptography key pairs by centralizing public keys within the network management server rather than populating redundant copies of them within multiple aggregation devices and/or satellite devices. Moreover, the disclosed apparatuses and methods may eliminate the use of a cumbersome Certificate Authority and/or Public Key Infrastructure, as discussed above.

Nevertheless, in alternative embodiments, the network management server and/or network administrator may function as a Certificate Authority. Specifically, during the initial period when the network administrator or network management server provisions asymmetric cryptography key pairs, such as by creating new LDEVIDS, the network administrator and/or network management server may simply sign public key certificates for the aggregation device and/or satellite device. These devices may then send these public key certificates to each other, and others, when they attempt to establish trusted network connections. Additionally, or alternatively, the message recipients may retrieve the public key certificates from a local Certificate Authority (e.g., network management server 230) and/or manufacturer Certificate Authority. The recipients of these public key certificates (e.g., DEVID X.509 public key certificates digitally signed using a private key of the network administrator and/or network management server acting as a Certificate Authority) may authenticate the certificates by applying the widely available public key for the network administrator and/or network management server. For example, in the example of FIG. 2, both aggregation device 100 and satellite device 200 already contain respective copies of the public key of the network management server. Each of these devices may use that public key to authenticate public key certificates received from the other device, thereby ensuring that the public key for each device (as specified within the public key certificate) actually corresponds to the transmitting device. In these examples, the aggregation device and the satellite device may authenticate each other without contacting the network management server.

Figure 5:
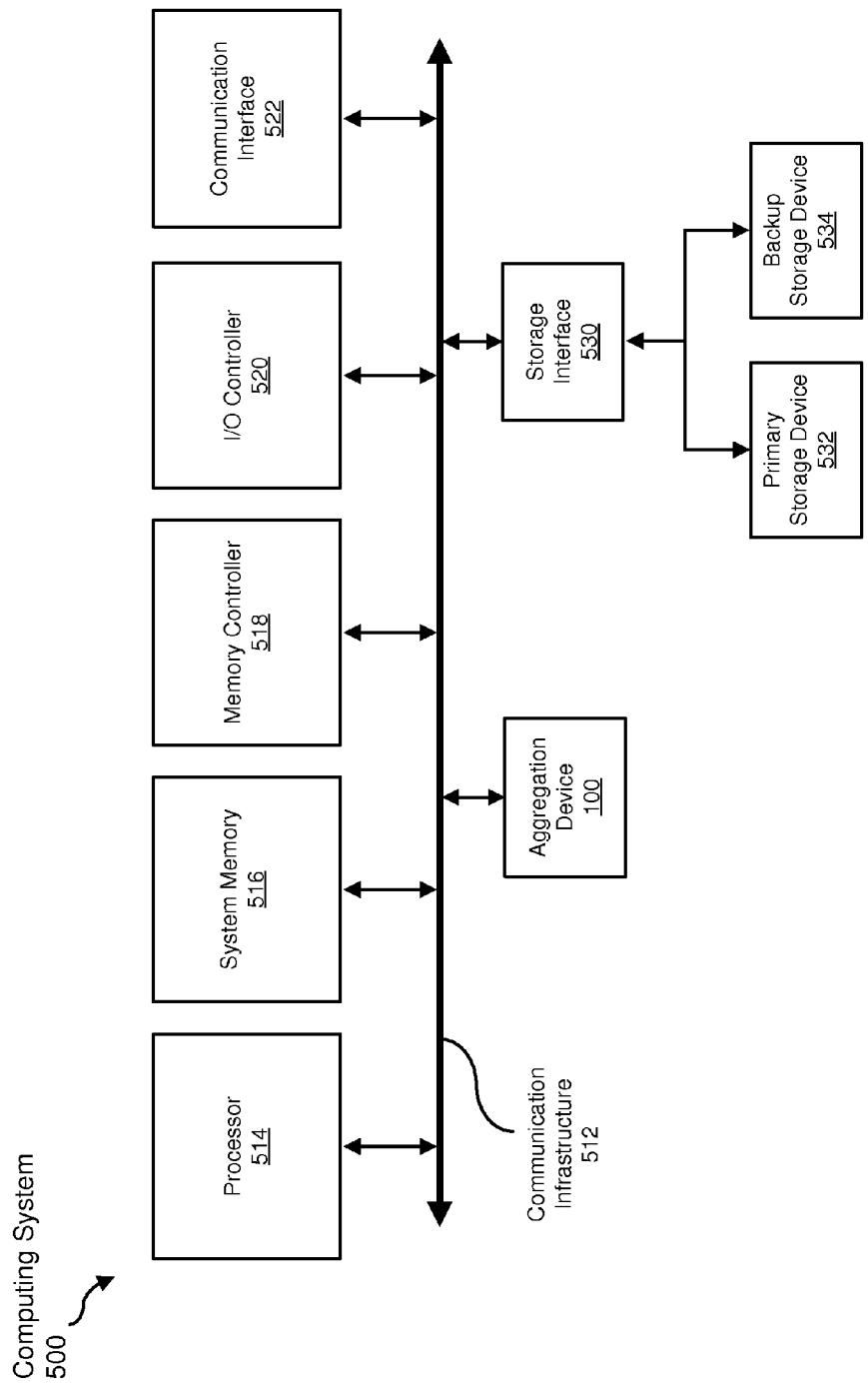
FIG. 5 is a block diagram of an exemplary computing system capable of implementing and/or being used in connection with one or more of the embodiments described and/or illustrated herein.

FIG. 5 is a block diagram of an exemplary computing system 500 capable of implementing and/or being used in connection with one or more of the embodiments described and/or illustrated herein. In some embodiments, all or a portion of computing system 500 may perform and/or be a means for performing, either alone or in combination with other elements, one or more of the steps described in connection with FIG. 3. All or a portion of computing system 500 may also perform and/or be a means for performing and/or implementing any other steps, methods, or processes described and/or illustrated herein. In one example, computing system 500 may include aggregation device 100 from FIG. 1.

Computing system 500 broadly represents any type or form of electrical load, including a single or multi-processor computing device or system capable of executing computer-readable instructions. Examples of computing system 500 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 500 may be programmed, configured, and/or otherwise designed to comply with one or more networking protocols. According to certain embodiments, computing system 500 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 500 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 500 may include various network and/or computing components. For example, computing system 500 may include at least one processor 514 and a system memory 516. Processor 514 generally represents any type or form of processing unit capable of processing data or interpreting and executing instructions. For example, processor 514 may represent an application-specific integrated circuit (ASIC), a system on a chip (e.g., a network processor), a hardware accelerator, a general purpose processor, and/or any other suitable processing element.

Processor 514 may process data according to one or more of the networking protocols discussed above. For example, processor 514 may execute or implement a portion of a protocol stack, may process packets, may perform memory operations (e.g., queuing packets for later processing), may execute end-user applications, and/or may perform any other processing tasks.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 500 may include both a volatile memory unit (such as, for example, system memory 516) and a non-volatile storage device (such as, for example, primary storage device 532, as described in detail below). System memory 516 may be implemented as shared memory and/or distributed memory in a network device. Furthermore, system memory 516 may store packets and/or other information used in networking operations.

In certain embodiments, exemplary computing system 500 may also include one or more components or elements in addition to processor 514 and system memory 516. For example, as illustrated in FIG. 5, computing system 500 may include a memory controller 518, an Input/Output (I/O) controller 520, and a communication interface 522, each of which may be interconnected via communication infrastructure 512. Communication infrastructure 512 generally represents any type or form of infrastructure capable of facilitating communication between one or more components of a computing device. Examples of communication infrastructure 512 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 518 generally represents any type or form of device capable of handling memory or data or controlling communication between one or more components of computing system 500. For example, in certain embodiments memory controller 518 may control communication between processor 514, system memory 516, and I/O controller 520 via communication infrastructure 512. In some embodiments, memory controller 518 may include a Direct Memory Access (DMA) unit that may transfer data (e.g., packets) to or from a link adapter.

I/O controller 520 generally represents any type or form of device or module capable of coordinating and/or controlling the input and output functions of a computing device. For example, in certain embodiments I/O controller 520 may control or facilitate transfer of data between one or more elements of computing system 500, such as processor 514, system memory 516, communication interface 522, and storage interface 530.

Communication interface 522 broadly represents any type or form of communication device or adapter capable of facilitating communication between exemplary computing system 500 and one or more additional devices. For example, in certain embodiments communication interface 522 may facilitate communication between computing system 500 and a private or public network including additional computing systems. Examples of communication interface 522 include, without limitation, a link adapter, a wired network interface (such as a network interface card), a wireless network interface (such as a wireless network interface card), and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 522 may also represent a host adapter configured to facilitate communication between computing system 500 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also enable computing system 500 to engage in distributed or remote computing. For example, communication interface 522 may receive instructions from a remote device or send instructions to a remote device for execution.

As illustrated in FIG. 5, exemplary computing system 500 may also include a primary storage device 532 and/or a backup storage device 534 coupled to communication infrastructure 512 via a storage interface 530. Storage devices 532 and 534 generally represent any type or form of storage device or medium capable of storing data and/or other computer-readable instructions. For example, storage devices 532 and 534 may represent a magnetic disk drive (e.g., a so-called hard drive), a solid state drive, a floppy disk drive, a magnetic tape drive, an optical disk drive, a flash drive, or the like. Storage interface 530 generally represents any type or form of interface or device for transferring data between storage devices 532 and 534 and other components of computing system 500.

In certain embodiments, storage devices 532 and 534 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 534 may also include other similar structures or devices for allowing computer software, data, or other computer-readable instructions to be loaded into computing system 500. For example, storage devices 532 and 534 may be configured to read and write software, data, or other computer-readable information. Storage devices 532 and 534 may be a part of computing system 500 or may be separate devices accessed through other interface systems.

Many other devices or subsystems may be connected to computing system 500. Conversely, all of the components and devices illustrated in FIG. 5 need not be present to practice the embodiments described and/or illustrated herein. The devices and subsystems referenced above may also be interconnected in different ways from those shown in FIG. 5. Computing system 500 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of aggregation device 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. For example, one or more of the modules recited herein may receive a network message to be transformed, transform the network message by modifying, encapsulating, digitally signing, and/or decrypting the network message, output a result of the transformation to a recipient network device, use the result of the transformation to authenticate network devices and protect the security of end-users, and store the result of the transformation to a storage or memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An aggregation device, comprising:
   a reply-reception module, stored in memory, that receives, from a satellite device, an authentication reply that:
      includes an original authentication message digitally signed by the aggregation device using a private key of the aggregation device; and
      is digitally signed by the satellite device using a private key of the satellite device;
   a forwarding module, stored in memory, that forwards the authentication reply to a network management server;
   a validation-reception module, stored in memory, that receives, from the network management server in response to forwarding the authentication reply, a validation message that:
      includes the authentication reply decrypted, by the network management server, using a public key of the satellite device;
      includes the original authentication message decrypted, by the network management server, using a public key of the aggregation device; and
      is digitally signed by the network management server using a private key of the network management server;
   an authentication module, stored in memory, that authenticates the satellite device based at least in part on receiving the validation message; and
   at least one physical processor configured to execute the reply-reception module, the forwarding module, the validation-reception module, and the authentication module.

2. The aggregation device of claim 1, further comprising a signature module, stored in memory, that digitally signs the original authentication message using the private key of the aggregation device.

3. The aggregation device of claim 2, wherein the reply-reception module receives the authentication reply from the satellite device at least in part by receiving the authentication reply from the satellite device in response to transmitting the digitally signed original authentication message to the satellite device.

4. The aggregation device of claim 1, wherein the original authentication message comprises a secure device identifier of the aggregation device.

5. The aggregation device of claim 4, wherein the secure device identifier corresponds to a secure device identifier that:
   a manufacturer of the aggregation device assigned to the aggregation device; and
   the manufacturer of the aggregation device signed with a private key of the manufacturer to validate the aggregation device.

6. The aggregation device of claim 1, wherein at least one of:
   the aggregation device stores the private key of the aggregation device within a trusted platform module comprising a secure cryptoprocessor that secures the aggregation device by integrating at least one cryptographic key into the aggregation device; and
   the satellite device stores the private key of the satellite device within a trusted platform module comprising a secure cryptoprocessor that secures the satellite device by integrating at least one cryptographic key into the satellite device.

7. The aggregation device of claim 1, wherein:
   the network management server comprises a trusted platform module that includes a secure cryptoprocessor that secures the network management server by integrating at least one cryptographic key into the network management server; and
   the network management server stores the public key of the aggregation device and the public key of the satellite device within the trusted platform module.

8. The aggregation device of claim 1, wherein the authentication module establishes a trusted network connection with the satellite device based at least in part on receiving the validation message.

9. The aggregation device of claim 1, wherein the authentication reply comprises a secure device identifier of the satellite device.

10. The aggregation device of claim 9, wherein the secure device identifier is formatted according to a version of the 802.1 AR protocol.

11. A method comprising:
   receiving, from a satellite device, an authentication reply that:
      includes an original authentication message digitally signed by an aggregation device within a network using a private key of the aggregation device; and
      is digitally signed by the satellite device using a private key of the satellite device;
   forwarding the authentication reply to a network management server;
   receiving, from the network management server in response to forwarding the authentication reply, a validation message that:
      includes the authentication reply decrypted, by the network management server, using a public key of the satellite device;
      includes the original authentication message decrypted, by the network management server, using a public key of the aggregation device;
      is digitally signed by the network management server using a private key of the network management server; and
   authenticating the satellite device based at least in part on receiving the validation message.

12. The method of claim 11, further comprising digitally signing the original authentication message using the private key of the aggregation device.

13. The method of claim 12, wherein receiving the authentication reply from the satellite device comprises receiving the authentication reply from the satellite device in response to transmitting the digitally signed original authentication message to the satellite device.

14. The method of claim 11, wherein the original authentication message comprises a secure device identifier of the aggregation device.

15. The method of claim 14 wherein the secure device identifier corresponds to a secure device identifier that:
- a manufacturer of the aggregation device assigned to the aggregation device; and
- the manufacturer of the aggregation device signed with a private key of the manufacturer to validate the aggregation device.

16. The method of claim 11, further comprising:
- storing, by the aggregation device, the private key of the aggregation device within a trusted platform module comprising a secure cryptoprocessor that secures the aggregation device by integrating at least one cryptographic key into the aggregation device; and
- storing, by the satellite device, the private key of the satellite device within a trusted platform module comprising a secure cryptoprocessor that secures the satellite device by integrating at least one cryptographic key into the satellite device.

17. The method of claim 11, wherein:
- the network management server comprises a trusted platform module that includes a secure cryptoprocessor that secures the network management server by integrating at least one cryptographic key into the network management server; and
- the network management server stores the public key of the aggregation device and the public key of the satellite device within the trusted platform module.

18. The method of claim 11, further comprising establishing a trusted network connection with the satellite device based at least in part on receiving the validation message.

19. The method of claim 11, wherein the authentication reply comprises a secure device identifier of the satellite device.

20. A non-transitory computer-readable medium comprising one or more computer-readable instructions that, when executed by at least one processor of a computing device, cause the computing device to:
- receive, from a satellite device, an authentication reply that:
  - includes an original authentication message digitally signed by an aggregation device within a network using a private key of the aggregation device; and
  - is digitally signed by the satellite device using a private key of the satellite device;
- forward the authentication reply to a network management server;
- receive, from the network management server in response to forwarding the authentication reply, a validation message that:
  - includes the authentication reply decrypted, by the network management server, using a public key of the satellite device;
  - includes the original authentication message decrypted, by the network management server, using a public key of the aggregation device; and
  - is digitally signed by the network management server using a private key of the network management server; and
- authenticate the satellite device based at least in part on receiving the validation message.

* * * * *